UNITED STATES PATENT OFFICE 2,359,753

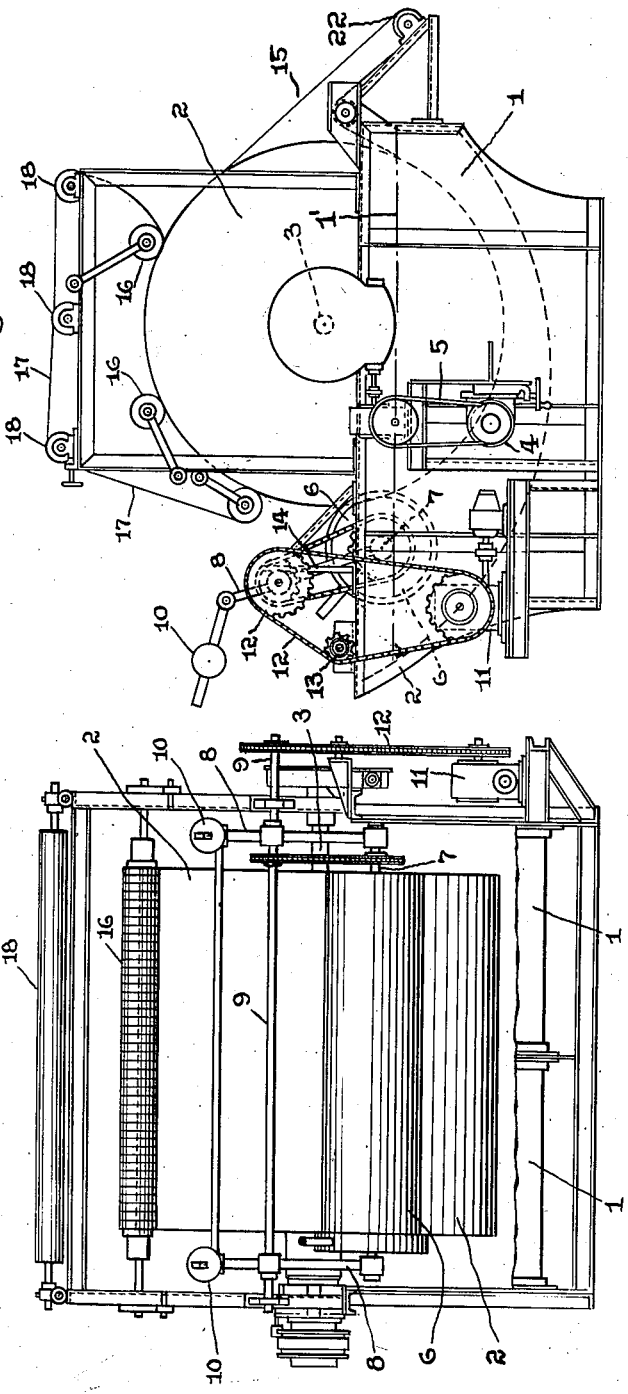

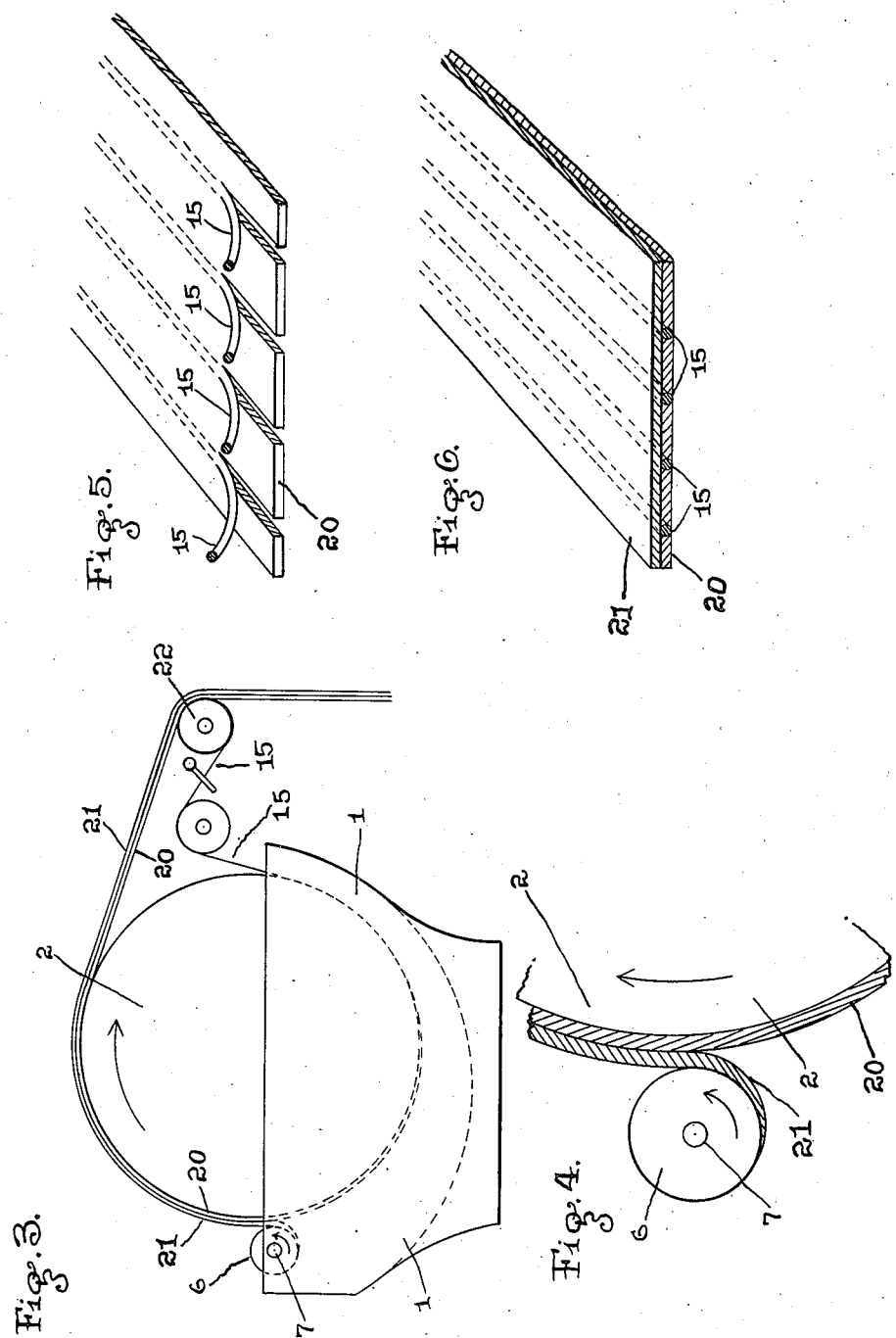

FILTRATION APPARATUS

Aloysius J. Devine, Harrison, and Edmund G. Smith, Cedar Grove, N. J., assignors to Filtration Engineers Incorporated, Newark, N. J., a corporation of New York Application November 4, 1941, Serial No. 417,756

6 Claims. (Cl. 210—199)

The invention relates to improvements in the art of filtration and particularly to the continuous process of filtration in which there is employed a rotary drum partially submerged in the slurry and whereby the filter cake is removed.

A device of this character is shown and described in the patent to Wright and Young, No. 1,880,005, dated September 27, 1932. In the invention of the said patent, the filter cake is reinforced by means of strands embedded therein whereby the range of efficient operation of the filter was extended to the handling of weak structured precipitates which could not be handled efficiently by the then known types of continuous rotary filter. An object of the present invention is to improve the said patented filter and to render the same capable of handling precipitates too weak for efficient handling by the apparatus therein described or by any other known rotary filter, and to further increase the efficiency of a rotary filter and its capacity.

In operation, it has been found that the filter cake produced by the above mentioned patented device in the handling of weak precipitates is too thin to be carried away by the reinforcing strands and that the strands tear out of the filter cake in such cases. An object of the present invention is to so strengthen and reinforce the filter cake that the strands will not tear out even when the surry is of such character that it may not be handled efficiently by the above-mentioned patented process and device.

It has been discovered that a reinforcing layer of filter cake laid upon the filter cake produced by the said patented apparatus will accomplish the desired result and prevent the reinforcing strands from tearing out of the filter cake. Such additional layer of filter cake may be applied at any desired point in advance of the tearing point of the filter cake and either above or below the level of the slurry but we have found it preferable to make the application of the additional layer above the level of the slurry in which the rotary drum is partially submerged. Furthermore, the additional layer of filter cake, so applied, may be either higher or lower in liquid content than that of the layer of filter cake on the rotary drum. An object of the present invention is to provide means for applying such additional layer of filter cake to the filter cake of the above-mentioned patented apparatus.

A further object of the invention is to provide in a continuous rotary filter having a rotary drum, an auxiliary roll or drum by means of which an additional layer of filter cake may be applied to the filter cake on the main drum.

A further object of the invention is to provide novel and useful means for mounting and operating a plurality of drums in a continuous rotary filter.

A further object of the invention is to provide means for producing filter cake.

Further objects and advantages of the invention will be apparent from the following specification and description of the invention.

A preferred embodiment of the invention is illustrated in the accompanying drawings, in which Figure 1 is a view of a continuous rotary filter apparatus;

Figure 2 is a side view of the device;

Figure 3 is a detail illustrating diagrammatically the operation of the transfer roll;

Figure 4 is a detail showing diagrammatically the application of a reinforcing layer of filter cake, by the transfer roll, to the filter cake on the main drum;

Figure 5 is a view of a filter cake produced by the method and apparatus of the present art, showing the tearing out of the reinforcing strands, which the present invention seeks to prevent; and Figure 6 is a view of a filter cake produced by the invention herein described.

Similar characters of reference refer to like parts throughout the several views.

The embodiment of the invention illustrated in the accompanying drawings comprises a tank 1 adapted to contain slurry and in which finely divided solids are held in suspension and which is supplied to the tank 1 in any desired manner. A rotary drum or cylinder 2 is carried by a shaft 3 in such manner that the lower portion of the drum 2 is below the slurry level, shown by dotted lines 1', and rotates therein. The drum or cylinder 2 is preferably driven by means of a motor 4 and connecting belt or chain means or the like 5. The drum 2 has a porous or perforated surface and is provided with means for creating suction therein whereby the solids are drawn from the slurry and deposited upon the drum or upon a filter medium thereon, and with valves for opening and closing the suction means, as is well understood in the art and described in the above mentioned patent.

Adjacent to the drum 2 and rotating in the slurry in the tank 1, there is provided a transfer roll 6 preferably of a diameter smaller than that of the drum 2 and having a like construction with respect to suction devices and valve means.

The transfer roll 6 rotates on its shaft 7 supported at each end by arms 8 which rock on a shaft 9 whereby the transfer roll 6 may be swung toward and from the drum 2. The upper ends of the arms 8 are preferably bent over in a direction opposite to that of the drum 2 and carry weights 10 which tend to swing over the lower ends of the arms 8 and the transfer roll 6 carried thereby and to press the transfer roll 6 toward the drum 2. By this means, the transfer roll 6 will yield to irregularities of thickness in the filter cake which passes between the drum 2 and transfer roll 6 as hereinafter described. The transfer roll 6 is preferably driven by means of a motor 11 and belt or chain means 12. An idler 13 may be provided for adjusting the length of the belt or chain 12 to varying conditions or position of the transfer roll 6. The shaft 9 which carries the arms 8 supporting the transfer roll 6 may be raised or lowered by means of the adjustable supporting brackets 14.

The drum 2 and transfer roll 6 may be driven by a common motor, if desired, and either the motor 4 or the motor 11 may be used for that purpose, but we find it preferable to drive them by means of separate motors as above described.

The drum 2 is provided with the usual peripheral filter medium to which the fine solid matter in the slurry is drawn by suction means contained in the drum 2 and forms thereon a layer of filter cake in which is embedded the strands 15 as more fully explained in the patent above mentioned. In cases where the filter cake so deposited on the drum 2, as explained in the above mentioned patent, is too thin to be carried by the strands 15 therein, the strands will tear out, as illustrated in Figure 5. When this occurs or when it is found that the filter cake is too thin for efficient operation, the transfer roll 6 is brought into operation, and is rotated in the slurry in the tank 1 and produces a supplemental layer of filter cake which is pressed by the transfer roll 6 against and caused thereby to adhere to the layer of filter cake on the drum 2 and more completely covers and embeds the strands 15 contained in the layer of filter cake on the drum 2, as illustrated in Figure 6, whereby there is produced, even with very weak filtrates, a combined layer of filter cake which is strong and will carry or hold the strands 15. The combined layers of filter cake may be caused to adhere more firmly and to be more thoroughly united by means of compression rolls 16 which are pressed against the combined layer of filter cake as it passes over the drum 2. An apron or pressing belt 17 on idlers 18 may be provided between the compression rolls 16 and the filter cake.

In the operation of the apparatus, the filter cake 20 from the slurry in the tank 1 is drawn to the rotary drum 2 and the endless reinforcing medium 15 is embedded in the layer of filter cake as more particularly described in the above mentioned patent, and the cake with its reinforcing medium is carried by the rotation of the drum 2, under the endless belt or apron 17 and the compression rollers 16, and is discharged at the stripping roller 22.

When the filter cake, so formed, is found to be too thin or too weak to be efficiently conveyed by the apparatus of the said patent, the auxiliary drum of transfer roll 6 is brought into operation by swinging it over against the drum 2. As the transfer roll 6 may be raised and lowered by the adjustable bracket 14, its elevation may be adjusted to the desired position for maximum efficiency in the cake forming zone and its pressure against the drum 2 may be adjusted by the weights 10 on the bent over ends of the carrying arms 8. The drum 2 rotates in a clockwise direction and the auxiliary transfer roll 6 rotates in a counterclockwise direction as viewed in Figure 2. An additional quantity or layer of cake will thus be drawn from the slurry in the tank 1, by the transfer roll 6, and deposited thereby upon the cake on the drum 2. This additional cake so deposited will be pressed against the cake on the drum 2 by the pressure of the weights 10 and a single layer of cake will be thus formed in which the reinforcing medium 15 is embedded as illustrated in Figure 6, which will be sufficiently strong and heavy to hold or carry the strands 15 and prevent them from tearing out until the cake reaches the terminus of its trip at the stripping roll 22.

Having thus described the invention, what is claimed is:

1. In a filtration apparatus, the combination of a tank adapted to contain slurry, a rotary perforated drum partially within the said tank, a plurality of strands on the periphery of the said drum, suction means within the drum and adapted to draw slurry contained in the said tank to the surface of the drum and to embed the said strands therein, and an transfer roll operable in the said tank adjacent to the said drum operable to lay a supplemental quantity of cake upon the first named layer of cake and means for adjustably positioning the said transfer roll with respect to the said drum.

2. In a filtration apparatus the combination of a tank, a rotary perforated drum having its lower portion in the said tank and suction means associated with the said drum operable to draw filter cake from the said tank to the surface of the said drum, a plurality of strands of reinforcing medium embedded in the cake on the said drum, a rotary transfer roll adjacent to the said drum and operable in the said tank to draw filter cake therefrom and to deposit the same on the filter cake on the said first named drum, and drive means for said drum and for said transfer roll and means for adjustably positioning the said transfer roll with respect to the said drum.

3. In a filtration apparatus, the combination of a tank, a perforated rotary drum having its lower portion rotatable in the said tank suction means associated with said drum and operable to draw to its surface filter cake from the said tank, a plurality of strands of reinforcing medium embedded in the said cake on the said drum, a rotary transfer roll adjacent to the said drum and operable to draw cake from the said tank and to deposit the same on the filter cake on the said drum, drive means for said drum and said transfer roll, and a compression roller mounted adjacent to the said drum and operable to press the said filter cake and means for adjustably positioning the said transfer roll with respect to the said drum.

4. In a filtration apparatus, the combination of a tank, a rotary drum partially submerged in the said tank, means for drawing cake from said tank to the said drum, a transfer roll rotatable in the said tank adjacent to the said drum and operable to deposit cake from said tank to said drum, and a mounting for the said transfer roll comprising a shaft upon which the said transfer roll is rotatable, a pair of swinging arms carrying the said shaft and having bent over end sections, weight means on the said bent over ends of the said arms, supporting means for the said arms mounted intermediate the ends of the said arms and upon which the said arms swing, and bracket means adjustably supporting the said transfer roll and adapted to vary its elevation relative to the said tank.

5. In a filtration apparatus, the combination of a tank adapted to contain slurry, a rotary perforated drum partially submerged therein, suction means associated with the said drum and operable to deposit thereon filter cake drawn from the said tank, a transfer roll rotatable in the said tank adjacent to the said drum and operable to deposit cake from the tank to the drum and means for adjustably positioning the said transfer roll toward and from the said drum, said last named means comprising a shaft upon which the transfer roll is mounted rotatably, a pair of swinging arms carrying the said shaft, counterbalance weight means on the said arms whereby the said transfer roll is pressed toward the said drum and supporting means for said arms.

6. In a filtration apparatus, the combination of a tank adapted to contain slurry, a rotary perforated drum partially submerged in the said tank, suction means for drawing solids from the said tank to the said drum, a transfer roll rotatable in the said tank adjacent to the said drum and operable to deposit solids from the said tank to the said drum, and a mounting for the said transfer roll comprising a shaft rotatably carrying said transfer roll and a pair of swinging arms on said shaft, weight means on the said arms and operable to press said transfer roll toward said drum and a support for said arms.

EDMUND G. SMITH.
ALOYSIUS J. DEVINE.